US012489222B2

(12) United States Patent
Lee et al.

(10) Patent No.: US 12,489,222 B2
(45) Date of Patent: Dec. 2, 2025

(54) ANTENNA DEVICE

(71) Applicants: DENSO CORPORATION, Kariya (JP); TOYOTA JIDOSHA KABUSHIKI KAISHA, Toyota (JP); MIRISE Technologies Corporation, Nisshin (JP)

(72) Inventors: Jungaun Lee, Nisshin (JP); Toshifumi Shirosaki, Nisshin (JP); Takahiro Kato, Nisshin (JP); Hirokazu Oyabu, Nisshin (JP); Toshihiko Takahata, Nisshin (JP)

(73) Assignees: DENSO CORPORATION, Kariya (JP); TOYOTA JIDOSHA KABUSHIKI KAISHA, Toyota (JP); MIRISE Technologies Corporation, Nisshin (JP)

( * ) Notice: Subject to any disclaimer, the term of this patent is extended or adjusted under 35 U.S.C. 154(b) by 116 days.

(21) Appl. No.: 18/394,770

(22) Filed: Dec. 22, 2023

(65) Prior Publication Data

US 2024/0291160 A1 Aug. 29, 2024

(30) Foreign Application Priority Data

Feb. 23, 2023 (JP) ................................ 2023-026805

(51) Int. Cl.
*H01Q 21/06* (2006.01)
*H01Q 21/00* (2006.01)

(52) U.S. Cl.
CPC ....... *H01Q 21/064* (2013.01); *H01Q 21/0006* (2013.01)

(58) Field of Classification Search
CPC ...... H01Q 1/2283; H01Q 1/3233; H01Q 1/36; H01Q 1/38; H01Q 13/0233; H01Q 21/0006; H01Q 21/0037; H01Q 21/0043; H01Q 21/005; H01Q 21/064; H01Q 21/0087; H01P 11/02
See application file for complete search history.

(56) References Cited

U.S. PATENT DOCUMENTS 5,568,160 A * 10/1996 Collins .................. H01Q 21/24 343/778
6,101,705 A * 8/2000 Wolfson ................ H01P 11/002 29/600
10,224,617 B2 3/2019 Chen et al.
2018/0034140 A1 * 2/2018 Chen .................... H01Q 9/0485

* cited by examiner

*Primary Examiner* — Robert Karacsony
(74) *Attorney, Agent, or Firm* — Posz Law Group, PLC

(57) ABSTRACT

Each of first, second, and third stacked parts includes a resin member a conductive film that covers the resin member. The first, second, and third stacked parts are stacked on one another. The first stacked part has an external port to propagate radio waves to an external device. The second stacked part has an intermediate passage to propagate the radio waves therethrough. The third stacked part has antenna radiating elements to propagate the radio waves to an external space. The first stacked part and the second stacked part are stacked to form a waveguide that is extended. The waveguide is connected to the external port of the first stacked part and to one end of the intermediate passage to propagate the radio waves therethrough. The antenna radiating elements are coupled to the one end of the intermediate passage.

6 Claims, 13 Drawing Sheets

ANTENNA DEVICE

CROSS REFERENCE TO RELATED APPLICATION

The present application is based on and claims the benefit of priority of Japanese Patent Application No. 2023-026805 filed on Feb. 23, 2023, the disclosure of which is incorporated herein by reference.

TECHNICAL FIELD

The present disclosure relates to an antenna device.

BACKGROUND

Conventionally, a waveguide antenna has been known as a type of an antenna device.

SUMMARY

According to an aspect of the present disclosure, an antenna device comprises a first stacked part, a second stacked part, and a third stacked part stacked on one another. The first stacked part includes a first resin member made of resin and a first film conductive and covering a surface of the first resin member. The first stacked part has an external port to cause radio waves to propagate to an external device that is configured to perform at least one of transmission and reception of the radio waves. The second stacked part has a second resin member made of resin and a second film electrically connected to the first film and covering a surface of the second resin member. The second stacked part has an intermediate passage to cause the radio waves to propagate therethrough. The third stacked part has a third resin member made of resin and a third film electrically connected to the second film and covering the surface of the third resin member. The third stacked part has a plurality of antenna radiating elements connected to an external space to cause the radio waves to propagate to the external space.

BRIEF DESCRIPTION OF THE DRAWINGS

Objects, features, and advantages of the present disclosure will become more apparent from the following detailed description made with reference to the accompanying drawings, in which.

DETAILED DESCRIPTION

Figure 1:
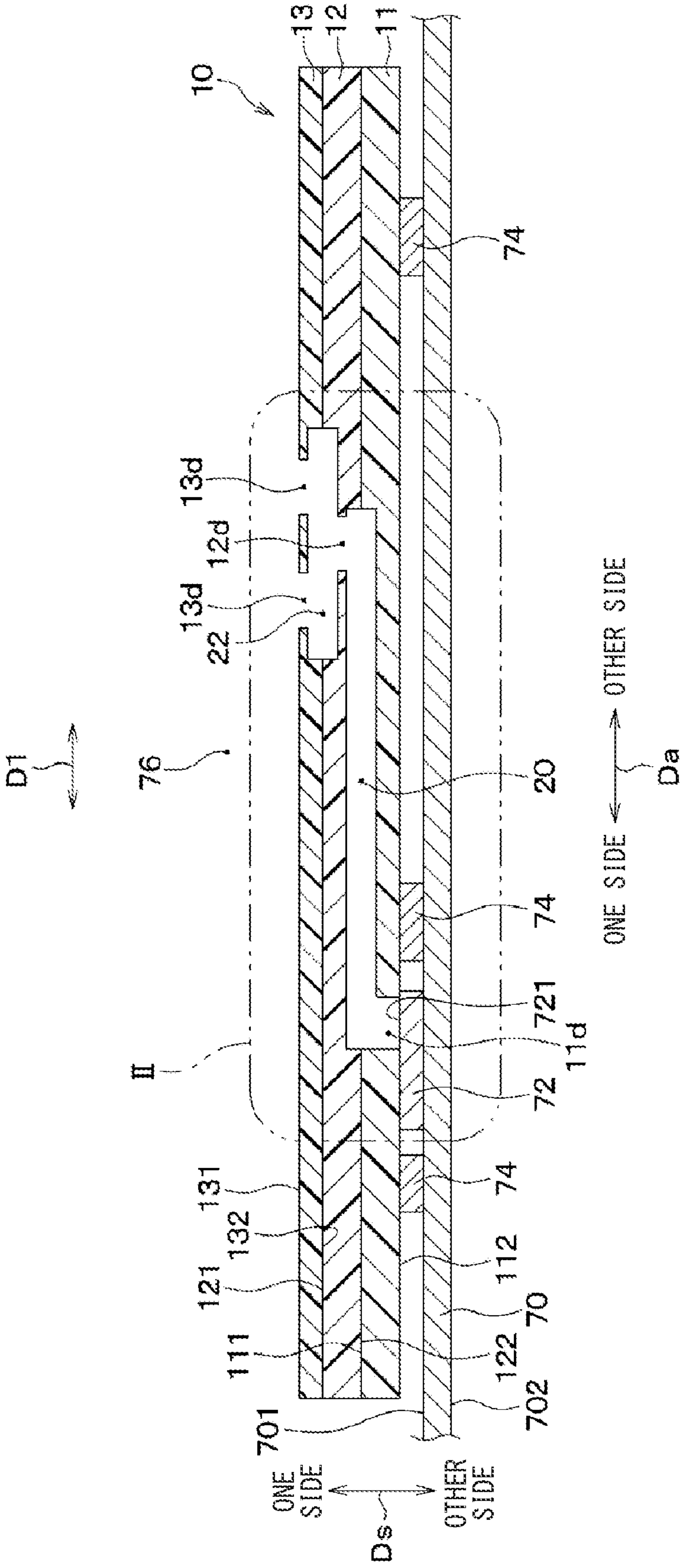
FIG. 1 is a cross-sectional view schematically showing a schematic configuration of an antenna device in a first embodiment.

Hereinafter, examples of the present disclosure will be described.

According to an example of the present disclosure, a waveguide antenna, as an example of antenna device, includes a first portion and a second portion stacked below the first portion. The first and second portions each consist of a polymer and a metal disposed on a surface of the polymer.

The first portion is provided with a plurality of radiating elements disposed on a top side of the first portion, and the second portion is provided with a port disposed on a bottom side of the second portion. Further, the waveguide antenna has a split structure that splits radio waves from the port into the plurality of radiating elements.

The above-described split structure develops its structure from a waveguide extending from the port in a horizontal direction (i.e., the XY direction in the XYZ orthogonal coordinate system) perpendicular to a vertical direction (i.e., the Z direction in the XYZ orthogonal coordinate system) in which the first portion and the second portion are stacked. Therefore, the waveguide antenna is increased in size due to the plurality of radiating elements. The inventors of the present disclosure have found these issues.

According to an example of the present disclosure, an antenna device is configured to cause radio waves to propagate therethrough. The antenna device comprises a first stacked part including a first resin member made of resin and a first film conductive and covering a surface of the first resin member. The first stacked part has an external port to cause radio waves to propagate to an external device that is configured to perform at least one of transmission and reception of the radio waves. The antenna device further comprises a second stacked part stacked on one side of the first stacked part in a stack direction. The second stacked part has a second resin member made of resin and a second film electrically connected to the first film and covering a surface of the second resin member. The second stacked part has an intermediate passage to cause the radio waves to propagate therethrough. The antenna device further comprises a third stacked part stacked on one side of the second stacked part in the stack direction and facing an external space on one side in the stack direction. The third stacked part has a third resin member made of resin and a third film electrically connected to the second film and covering the surface of the third resin member. The third stacked part has a plurality of antenna radiating elements connected to the external space to cause the radio waves to propagate to the external space. The intermediate passage has one end on one side in the stack direction and an other end on an other side opposite to the one side in the stack direction. The first stacked part and the second stacked part are stacked to face each other to form a waveguide that extends in a passage axis direction that intersects the stack direction. The waveguide is connected to the external port and to the other end of the intermediate passage to cause the radio waves to propagate between the external port and the intermediate passage. Each of the antenna radiating elements is coupled to the one end of the intermediate passage.

In such manner, a propagation path through which the radio waves propagate between the external port and the plurality of antenna radiating elements branches on the one side of the intermediate passage in the stack direction. That is, the propagation path branches at a position between the waveguide and the plurality of antenna radiating elements in the stack direction. Therefore, the configuration enables to suppress increase in size of the first to third stacked parts in the direction perpendicular to the stack direction (that is, the XY direction in the XYZ orthogonal coordinate system). As a result, the configuration enables to suppress increase in size of the antenna device as a whole.

Hereinafter, embodiments are described with reference to the drawings. In the following embodiments, the same reference symbol is given to the same or equivalent parts in the drawings.

First Embodiment

Figure 2:
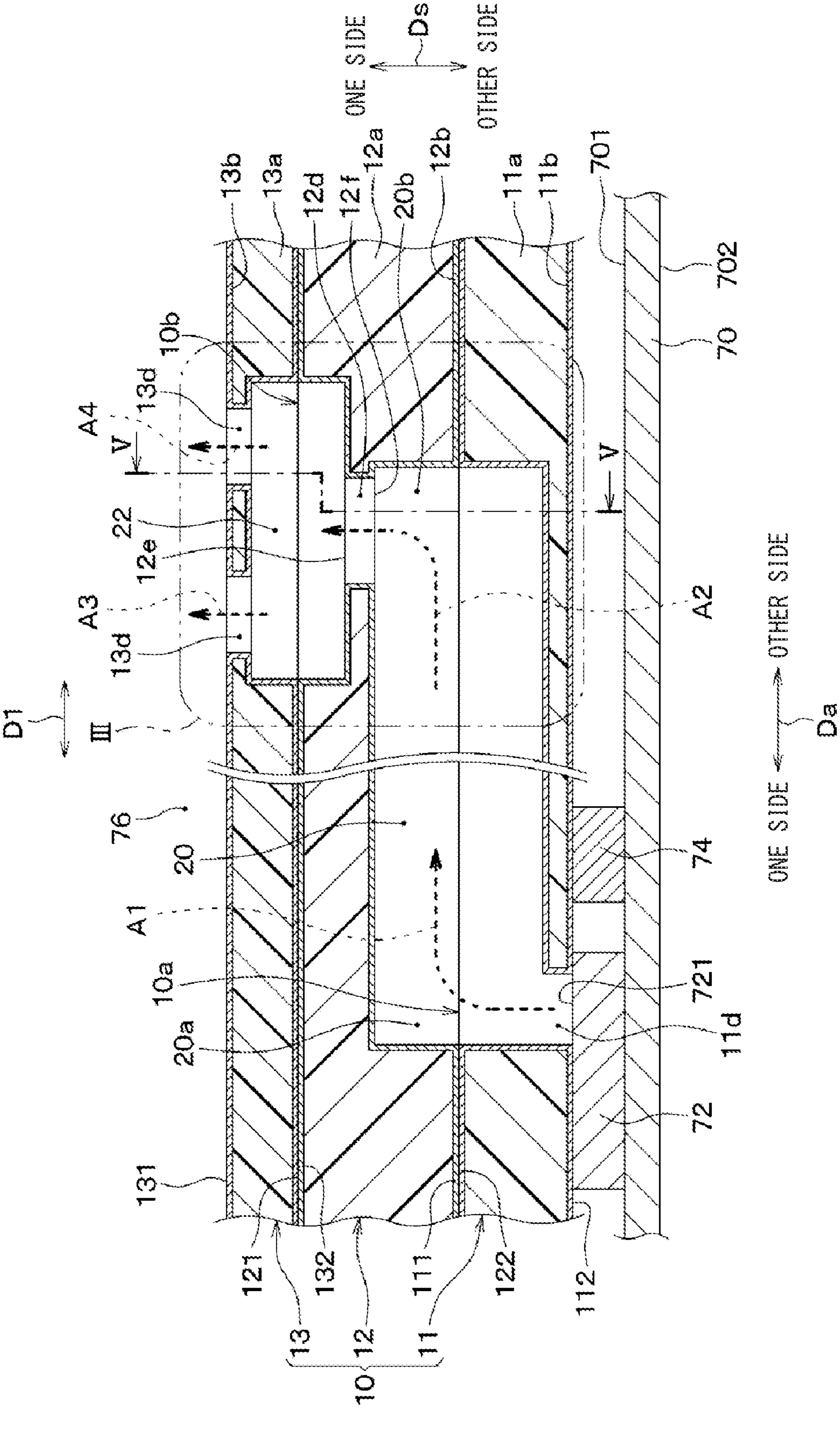
FIG. 2 is a cross-sectional view schematically showing a portion II of FIG. 1 in the first embodiment.

As shown in FIGS. 1 and 2, an antenna device 10 of the present embodiment is an antenna that transmits radio waves transmitted and received by an MMIC 72, which is an electrical component mounted on an electric board 70. The radio waves transmitted and received by the MMIC 72 are millimeter waves or submillimeter waves in the present embodiment, but may also be radio waves other than millimeter waves or submillimeter waves. Note that MMIC is an abbreviation for "Monolithic Microwave Integrated Circuit," and in other words, it is a monolithic microwave integrated circuit.

The electric board 70 is a printed circuit board on which a plurality of wiring patterns are formed using metal such as copper foil or the like. The electric board 70 has a one surface 701 formed on one side in a thickness direction of the electric board 70, and an other surface 702 formed on an other side in the thickness direction of the electric board 70.

The MMIC 72 is soldered and mounted on the one surface 701 of the electric board 70. The MMIC 72 is an external device provided outside the antenna device 10, and transmits and receives radio waves. The MMIC 72 has an input/output unit 721 that transmits and receives radio waves.

On the one surface 701 of the electric board 70, in addition to the MMIC 72, a plurality of spacers 74 are arranged. For example, the plurality of spacers 74 have electric conductivity and are fixed to the electric board 70.

As shown in FIGS. 1 to 4, the antenna device 10 has a stacked structure having three stacked parts 11, 12, and 13 stacked in a stack direction Ds. Specifically, the three stacked parts 11, 12, and 13 are a first stacked part 11, a second stacked part 12, and a third stacked part 13. The second stacked part 12 is stacked on one side of the first stacked part 11 in the stack direction Ds, and the third stacked part 13 is stacked on one side of the second stacked part 12 in the stack direction Ds. The first stacked part 11, the second stacked part 12, and the third stacked part 13 are coupled to each other by screws, adhesive, or the like.

As shown in FIGS. 1 and 2, the antenna device 10 is placed on one side of the electric board 70 in the stack direction Ds with the MMIC 72 and a plurality of spacers 74 interposed therebetween. That is, with respect to the MMIC 72 and the plurality of spacers 74, the antenna device 10 is arranged on one side in the stack direction Ds, and the electric board 70 is arranged on the other side opposite to the one side in the stack direction Ds. Further, the antenna device 10 is in contact with the MMIC 72 and the plurality of spacers 74 from one side in the stack direction Ds. For example, the antenna device 10 is fixed to the electric board 70 with screws, adhesive, or the like, with the MMIC 72 and a plurality of spacers 74 sandwiched between the antenna device 10 and the electric board 70.

Figure 5:
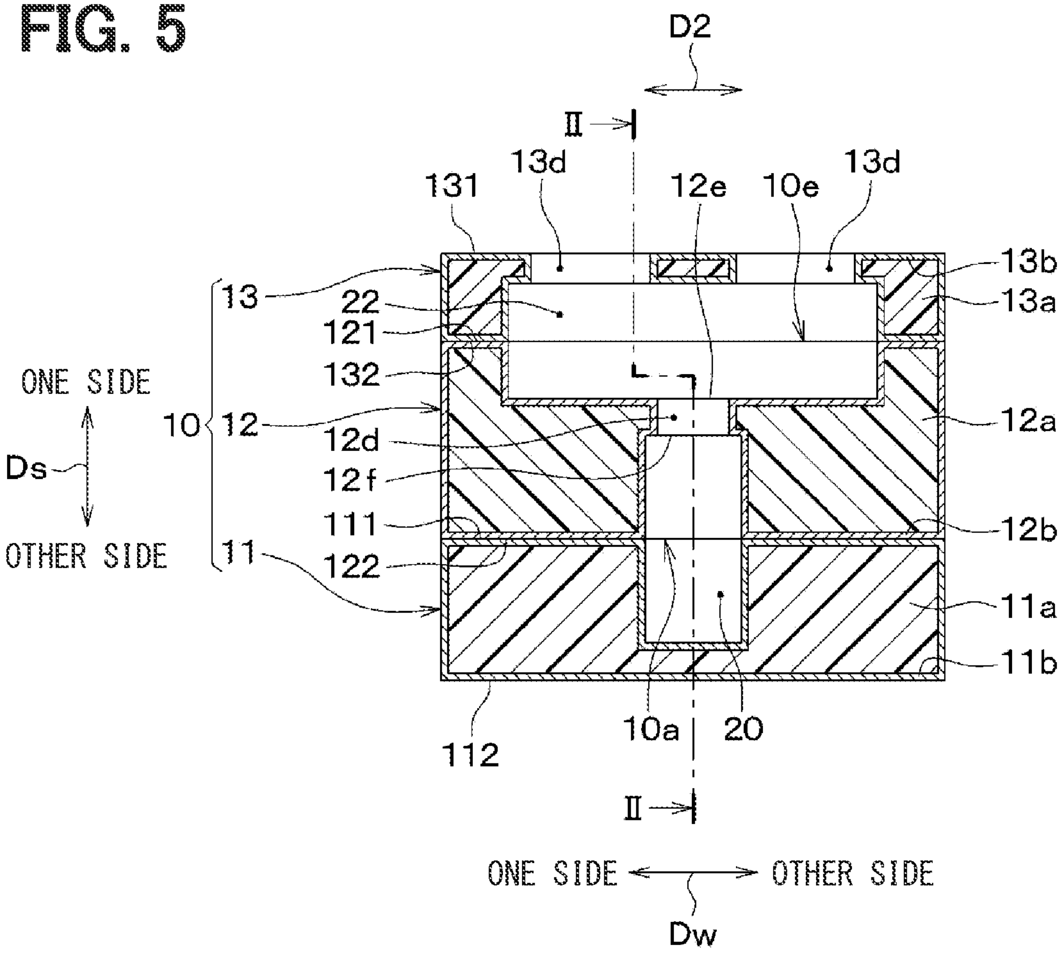
FIG. 5 is a cross-sectional view taken along a line V-V in FIG. 2 in the first embodiment.

In the description of the present embodiment, as shown in FIGS. 1, 2, and 5, one direction perpendicular to the stack direction Ds will be referred to as a first direction D1, and a direction perpendicular to the first direction D1 and the stack direction Ds will be referred to as a second direction D2. Further, in the present embodiment, the thickness direction of the electric board 70 described above is the same direction as the stack direction Ds, one side in the thickness direction is also one side in the stack direction Ds, and the other side in the thickness direction is the same as the other side in the stack direction Ds. Further, FIG. 2 shows a cross section taken along a line II-II in FIG. 5.

Further, the first stacked part 11 includes a first resin member 11*a* made of resin, and a first film 11*b* that covers a surface of the first resin member 11*a*. Similarly, the second stacked part 12 includes a second resin member 12*a* made of resin and a second film 12*b* covering a surface of the second resin member 12*a*. The third stacked part 13 includes a third resin member 13*a* made of resin, and a third film 13*b* covering a surface of the third resin member 13*a*.

These first to third films 11*b*, 12*b*, and 13*b* are all metal films formed by plating. Therefore, the first film 11*b* covers an entire surface of the first resin member 11*a*, the second film 12*b* covers an entire surface of the second resin member 12*a*, and the third film 13*b* covers an entire surface of the third resin member 13*a*. The first to third films 11*b*, 12*b*, and 13*b* are electrically conductive films. Note that in FIG. 1, illustration of the first to third films 11*b*, 12*b*, and 13*b* is omitted for the ease of viewing, and this also applies to later-described figures corresponding to FIG. 1.

The first stacked part 11 has a first one surface 111 formed on one side in the stack direction Ds, and a first other surface 112 formed on the other side in the stack direction Ds. Further, the second stacked part 12 has a second one surface 121 formed on one side in the stack direction Ds, and a second other surface 122 formed on the other side in the stack direction Ds. Further, the third stacked part 13 has a third one surface 131 formed on one side in the stack direction Ds, and a third other surface 132 formed on the other side in the stack direction Ds. These first one surface 111, first other surface 112, second one surface 121, second other surface 122, third one surface 131, and third other surface 132 are respectively extending in the first direction D1 and the second direction D2, to have a planar shape.

The first one surface 111 and the second other surface 122 face each other and are in contact with each other, and due to such mutual contact, the second film 12*b* is electrically connected to the first film 11*b*. The second one surface 121 and the third other surface 132 face each other and are in contact with each other, and due to such mutual contact, the third film 13*b* is electrically connected to the second film 12*b*.

The first other surface 112 faces the one surface 701 of the electric board 70 with the MMIC 72 and the plurality of spacers 74 interposed therebetween, and is in contact with the plurality of spacers 74, respectively. Further, the first film 11*b* extends to reach the first other surface 112, thereby the first film 11*b* is in electrical contact with a ground pattern included in a wiring pattern formed on the electric board 70 via at least one of the plurality of spacers 74. Thereby, not only the first film 11*b* but also the second film 12*b* and the third film 13*b* are electrically connected to the ground pattern of the electric board 70. The ground pattern of the electric board 70 is set at ground potential.

The third one surface 131 faces one side in the stack direction Ds, and faces an external space 76 around the antenna device 10. That is, the third stacked part 13 faces the external space 76 on one side of the third stacked part 13 in the stack direction Ds.

As shown in FIGS. 1 and 2, an external port 11*d* is formed in the first stacked part 11 so that radio waves can propagate between the first stacked part 11 and the MMIC 72. More specifically, this external port 11*d* is formed as a hole that has opening on the first other surface 112 facing the other side in the stack direction Ds, and the first film 11*b* is formed over an entire inner wall surface of the hole that is the external port 11*d*. The external port 11*d* is arranged to face the input/output unit 721 of the MMIC 72, and such an arrangement allows radio waves to propagate between the external port 11*d* and the MMIC 72.

As shown in FIGS. 1, 2, and 5, the second stacked part 12 is formed with an intermediate passage 12*d* through which radio waves propagate. Specifically, the intermediate passage 12*d* is formed as a hole aligned with the stack direction Ds, and the second film 12*b* is provided over an entire inner wall surface of the hole, which is the intermediate passage 12*d*. The intermediate passage 12*d* has one end 12*e* provided on one side in the stack direction Ds, and an other end 12*f* provided on the other side in the stack direction Ds.

A plurality of antenna radiating elements 13*d* each connected to the external space 76 are formed in the third stacked part 13 so that radio waves propagate to and from the external space 76. The plurality of antenna radiating elements 13*d* are arranged side by side at intervals in the first direction D1, and are also arranged at intervals in the second direction D2.

More specifically, each of the plurality of antenna radiating elements 13*d* is formed as a hole that has opening in the third one surface 131 facing one side in the stack direction Ds. That is, each of the plurality of antenna radiating elements 13*d* is open to the external space 76. Further, the third film 13*b* is provided over an entire inner wall surface of the hole, which is the antenna radiating element 13*d*. Such a configuration of the antenna radiating element 13*d* allows radio waves to propagate between each of the plurality of antenna radiating elements 13*d* and the external space 76.

The first stacked part 11 and the second stacked part 12 are stacked on one another to form a waveguide 20 in which the first stacked part 11 and the second stacked part 12 face each other. In other words, the waveguide 20 is formed between, or defined by, the first stacked part 11 and the second stacked part 12. Specifically, the waveguide 20 is formed as a hollow space and extends in a passage axial direction Da of a hollow space of the waveguide 20. The passage axial direction Da is a direction that intersects with the stack direction Ds, strictly speaking, a direction perpendicular to the stack direction Ds, and in the present embodiment matches the first direction D1.

A cross section obtained by cutting the waveguide 20 along a plane perpendicular to the passage axial direction Da (i.e., the cross section of the waveguide 20) has a rectangular shape extending in the stack direction Ds. Further, the first film 11*b* or the second film 12*b* is provided over the entire inner wall surface of the waveguide 20.

Moreover, the waveguide 20 has one end 20*a* provided on one side in the passage axial direction Da, and an other end 20*b* provided on the other side in the passage axial direction Da. The waveguide 20 is connected at the one end 20*a* to the external port 11*d*, and at the other end 20*b* to the other end 12*f* of the intermediate passage 12*d*. Via such connection, the waveguide 20 propagates radio waves between the external port 11*d* and the intermediate passage 12*d*. The external port 11*d* connected to the waveguide 20 is a through hole that penetrates the first stacked part 11 from the waveguide 20 to the other side in the stack direction Ds.

The waveguide 20 is formed at a position between the first stacked part 11 and the second stacked part 12 as described above, but, more specifically, the waveguide 20 is formed to bite into each of the first stacked part 11 and the second stacked part 12, in the stack direction Ds, at a position therebetween. That is, the waveguide 20 is formed as a combination of (a) a groove formed in the first stacked part 11 which is recessed from the first one surface 111 to the other side in the stack direction Ds, and (b) a groove formed in the first stacked part 11 which is recessed from the second other surface 122 to one side in the stack direction Ds. Therefore, the waveguide 20 extends, in the stack direction Ds, to one side and to the other side of a seam 10*a* between the first stacked part 11 and the second stacked part 12.

The second stacked part 12 and the third stacked part 13 are stacked on each other to form a branch part 22 where the second stacked part 12 and the third stacked part 13 face each other. In other words, the branch part 22 is formed at a position between the second stacked part 12 and the third stacked part 13. Specifically, the branch part 22 is formed as a hollow space, and expands in the first direction D1 and the second direction D2. Further, the second film 12*b* or the third film 13*b* is provided over an entire inner wall surface of the branch part 22.

Further, the branch part 22 is provided at a position between each of the plurality of antenna radiating elements 13*d* and the intermediate passage 12*d* in the stack direction Ds, and is connected to each of the plurality of antenna radiating elements 13*d* and to the one end 12*e* of the intermediate passage 12*d*. That is, the plurality of antenna radiating elements 13*d* are respectively connected to the branch part 22 from one side in the stack direction Ds, and the intermediate passage 12*d* is connected to the same from the other side in the stack direction Ds. Yet, in other words, the plurality of antenna radiating elements 13*d* are each connected to the one end 12*e* of the intermediate passage 12*d* via the branch part 22. Due to connections described above, the branch part 22 propagates radio waves between each of the plurality of antenna radiating elements 13*d* and the intermediate passage 12*d*.

Each of the plurality of antenna radiating elements 13*d* is a through hole that penetrates the third stacked part 13 from the branch part 22 to one side in the stack direction Ds. Further, the intermediate passage 12*d* is a through hole that penetrates the second stacked part 12 at a position between the branch part 22 and the waveguide 20.

As shown in FIG. 5, the branch part 22 is larger than the waveguide 20 in a width direction Dw of the waveguide 20. That is, the branch part 22 is formed to extend to one side and the other side in the width direction Dw with respect to the waveguide 20 and the intermediate passage 12*d*. Note that the width direction Dw of the waveguide 20 is a direction perpendicular to the stack direction Ds and the passage axial direction Da, and in the present embodiment matches the second direction D2. Further, in the description of the present embodiment, the width direction Dw of the waveguide 20 may also be referred to as a passage width direction Dw.

Further, as shown in FIGS. 2 and 5, the branch part 22 is formed at a position between the second stacked part 12 and the third stacked part 13 as described above, but, more specifically, the branch part 22 is formed to bite into the first stacked part 11 and the second stacked part 12 in the stack direction Ds, at a position therebetween. That is, the branch part 22 is formed as a combination of (a) a depression formed on the second stacked part 12 which is recessed from the second one surface 121 to the other side in the stack direction Ds, and (b) a depression formed on the second stacked part 12 which is recessed from the third other surface 132 to one side in the stack direction Ds. Therefore, the branch part 22 extends, in the stack direction Ds, to one side and to the other side of a seam 10*b* between the second stacked part 12 and the third stacked part 13.

In the antenna device 10 configured as described above, for example, when radio waves are output from the input/output unit 721 of the MMIC 72, the radio waves are input to the external port 11*d*. The radio waves input to the external port 11*d* pass from the external port 11*d*, through the waveguide 20, and the intermediate passage 12*d* in this order, as indicated by arrows A1 and A2 in FIG. 2, and reach the branch part 22. Then, the radio waves that have reached the branch part 22 branch into the plurality of antenna radiating elements 13*d* at the branch part 22, and are radiated from the plurality of antenna radiating elements 13*d* to the external space 76 as shown by arrows A3 and A4.

Note that, when the input/output unit 721 of the MMIC 72 receives radio waves from the external space 76, the antenna device 10 propagates the radio waves in an opposite direction, opposite to a direction of when the radio waves are output from the input/output unit 721 described above.

As described above, according to the present embodiment, the intermediate passage 12*d* of the second stacked part 12 has the one end 12*e* provided on one side in the stack direction Ds, and the other end 12*f* provided on the other side in the stack direction Ds. The waveguide 20 extends in the passage axial direction Da that intersects the stack direction Ds, and is connected to (a) the external port 11*d* of the first stacked part 11 and (b) the other end 12*f* of the intermediate passage 12*d*, and propagates the radio waves between the external port 11*d* and the intermediate passage 12*d*. Further, the plurality of antenna radiating elements 13*d* of the third stacked portion 13 are each connected to the one end 12*e* of the intermediate passage 12*d*.

Thereby, the propagation path through which radio waves propagate between the external port 11*d* and the plurality of antenna radiating elements 13*d* branches at a position on one side in the stack direction Ds relative to the intermediate passage 12*d*. That is, the propagation path branches at a position between the waveguide 20 and the plurality of antenna radiating elements 13*d* in the stack direction Ds. Therefore, the configuration enables to suppress increase in size of the first to third stacked parts 11, 12, and 13 in the passage axial direction Da and in the passage width direction Dw. As a result, the configuration enables to suppress increase in size of the antenna device 10 as a whole.

(1) Further, according to the present embodiment, the branch part 22 is provided at a position between each of the plurality of antenna radiating elements 13*d* and the intermediate passage 12*d*, and propagates the radio waves at a position between each of the plurality of antenna radiating elements 13*d* and the intermediate passage 12*d*. The branch part 22 is formed as a larger part than the waveguide 20 in the passage width direction Dw.

In such manner, it is possible to arrange the plurality of antenna radiating elements 13*d* side by side in the passage width direction Dw, thereby (a) suppressing increase in size of the antenna device 10 in the passage axial direction Da, while (b) providing the number of antenna radiating elements 13*d*. Further, the gain of the antenna device 10 increases as the number of antenna radiating elements 13*d* increases.

(2) Further, according to the present embodiment, the branch part 22 is formed to bite into each of the second stacked part 12 and the third stacked part 13 in the stack direction Ds. Therefore, by an amount of the branch part 22 biting into the third stacked part 13, the thickness of the third stacked part 13 in the stack direction Ds is increasable, thereby, for example, raising the bending rigidity of the third stacked part 13. Similarly, for the second stacked part 12, the bending rigidity of the second stacked part 12 is raised, for example.

Second Embodiment

The second embodiment of the present disclosure is described next. The present embodiment is explained mainly with respect to points different from those of the first embodiment. In addition, explanations of the same or equivalent portions as those in the above embodiment are omitted or simplified. The same applies to the description of embodiments to be described later.

Figure 6:
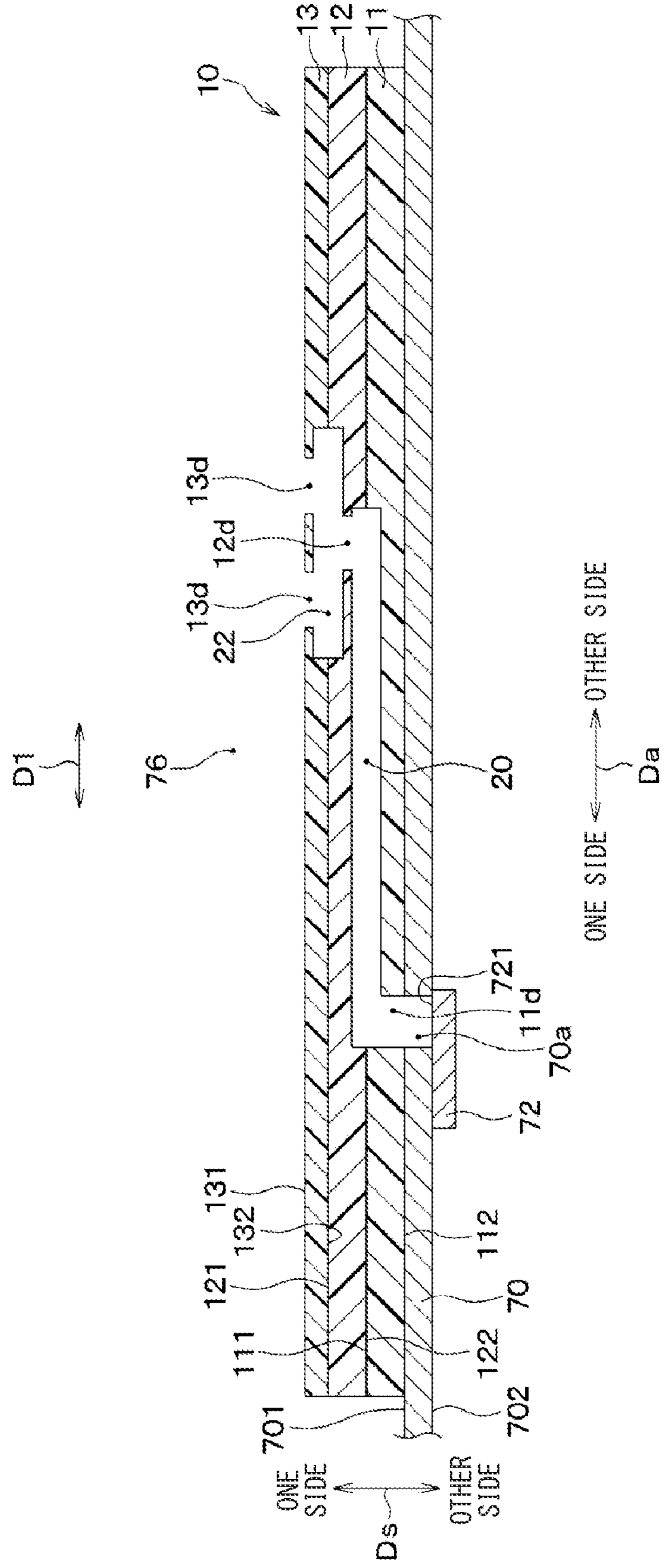
FIG. 6 is a cross-sectional view schematically showing a schematic configuration of an antenna device in a second embodiment, and is a view corresponding to FIG. 1.

As shown in FIG. 6, in the present embodiment, a spacer 74 (see FIG. 1) is not provided, and an antenna device 10 is arranged such that a first stacked part 11 is in contact with a one surface 701 of an electric board 70. An MMIC 72 is soldered and mounted not on the one surface 701 of the electric board 70 but on an other surface 702 of the electric board 70. Although the spacer 74 is not provided in the present embodiment, a first film 11*b* (see FIG. 2) of the first stacked part 11 is electrically connected to a ground pattern of the electric board 70, as in the first embodiment.

Further, a board through hole 70*a* is formed in the electric board 70 at a position corresponding to an input/output unit 721 of the MMIC 72, which penetrates the electric board 70 in the stack direction Ds. An external port 11*d* of the first stacked part 11 is arranged to face the input/output unit 721 of the MMIC 72 with the board through hole 70*a* interposed therebetween. Such an arrangement allows radio waves to propagate between the external port 11*d* and the MMIC 72.

The present embodiment is similar to the first embodiment, except for the above-described aspects. Thus, the present embodiment can achieve the advantages obtained by the configuration common to the first embodiment described above in a similar manner as in the first embodiment.

Third Embodiment

The third embodiment is described next. The present embodiment is explained mainly with respect to points different from those of the first embodiment.

Figure 7:
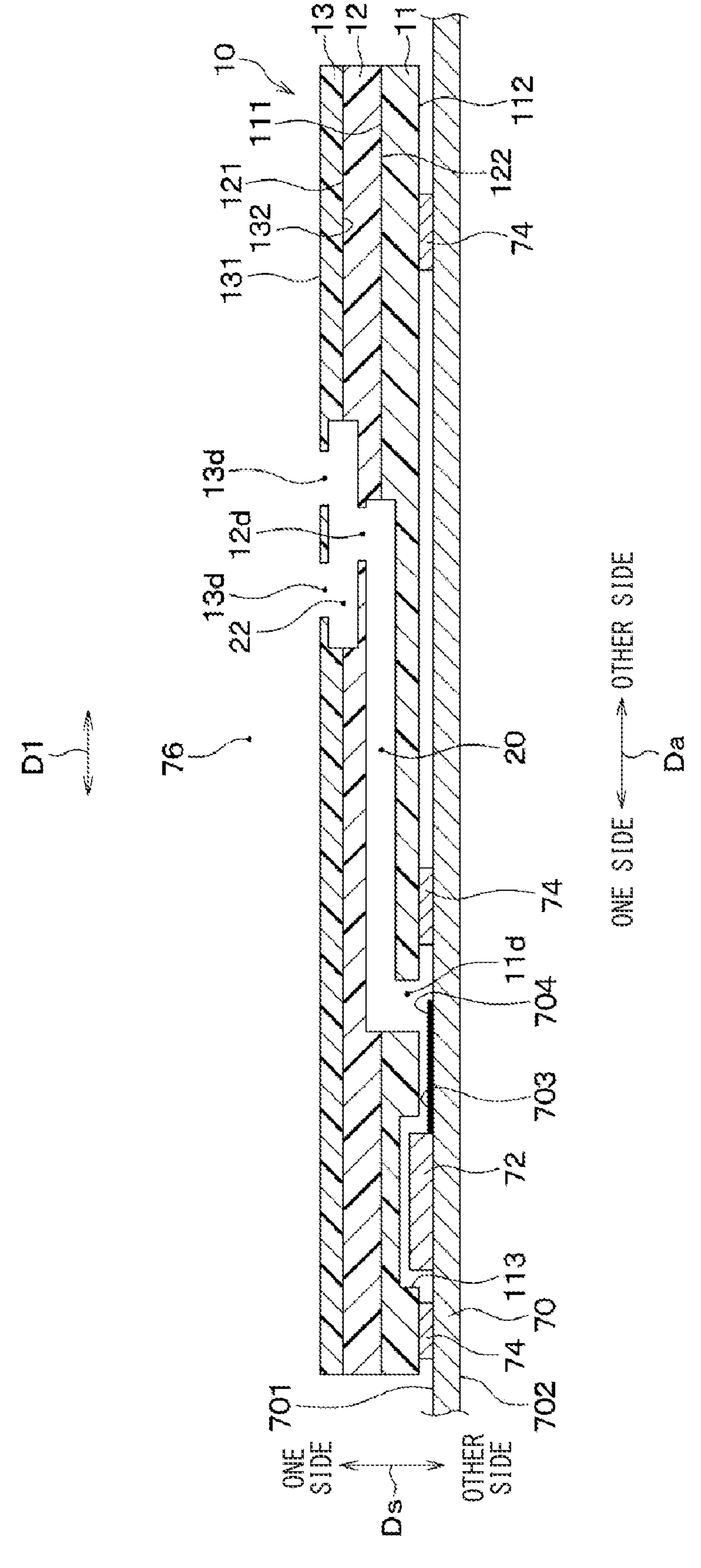
FIG. 7 is a cross-sectional view schematically showing a schematic configuration of an antenna device in a third embodiment, and is a view corresponding to FIG. 1.

As shown in FIG. 7, in the present embodiment, an MMIC 72 does not have the input/output unit 721 (see FIG. 1). Instead, an electric board 70 has connection wiring 703 and an input/output unit 704. Both the connection wiring 703 and the input/output unit 704 are configured using metal (for example, copper foil) wiring patterns formed on a one surface 701 of the electric board 70.

The connection wiring 703 is formed to be led out from the MMIC 72 along the one surface 701 of the electric board 70. The connection wiring 703 is connected to a terminal of the MMIC 72 by soldering, and a tip of the connection wiring 703 is connected to the input/output unit 704. Thereby, the input/output unit 704 is electrically connected to the MMIC 72 via the connection wiring 703.

The input/output unit 704 of the electric board 70 transmits and receives radio waves to and from an external port 11*d* of the antenna device 10. In short, the input/output unit 704 of the electric board 70 functions similarly to the input/output unit 721 of the MMIC 72 of the first embodiment (see FIG. 1) with respect to the external port 11*d* of the antenna device 10. For example, when transmitting radio waves, the input/output unit 704 converts an electrical signal from the MMIC 72 into radio waves, and outputs the radio waves to the external port 11*d*. Further, when receiving radio waves, the input/output unit 704 converts the radio waves received from the external port 11*d* into an electrical signal, and sends the electrical signal to the MMIC 72. In such manner, the input/output unit 704 of the electric board 70 functions as a converter that converts an electric signal or a radio wave into the other.

The external port 11*d* of the present embodiment is arranged to face the input/output unit 704 of the electric board 70, and such an arrangement allows radio waves to propagate between the external port 11*d* and the input/output unit 704. Therefore, in the present embodiment, the external devices provided for propagating radio waves between the external port 11*d* of the antenna device 10 and the external port 11*d* are the electric board 70 and the MMIC 72.

In addition, in the present embodiment, in order to arrange the antenna device 10 closer to the electric board 70 in the stack direction Ds than in the first embodiment, the first stacked part 11 has a recess 113 formed to be recessed from the first other surface 112 toward the one side in the stack direction Ds. The MMIC 72 is partially inserted into the recess 113.

The present embodiment is similar to the first embodiment, except for the above-described aspects. Thus, the present embodiment can achieve the advantages obtained by the configuration common to the first embodiment described above in a similar manner as in the first embodiment.

Fourth Embodiment

The fourth embodiment is described next. The present embodiment will be explained mainly with respect to points different from those of the third embodiment.

Figure 8:
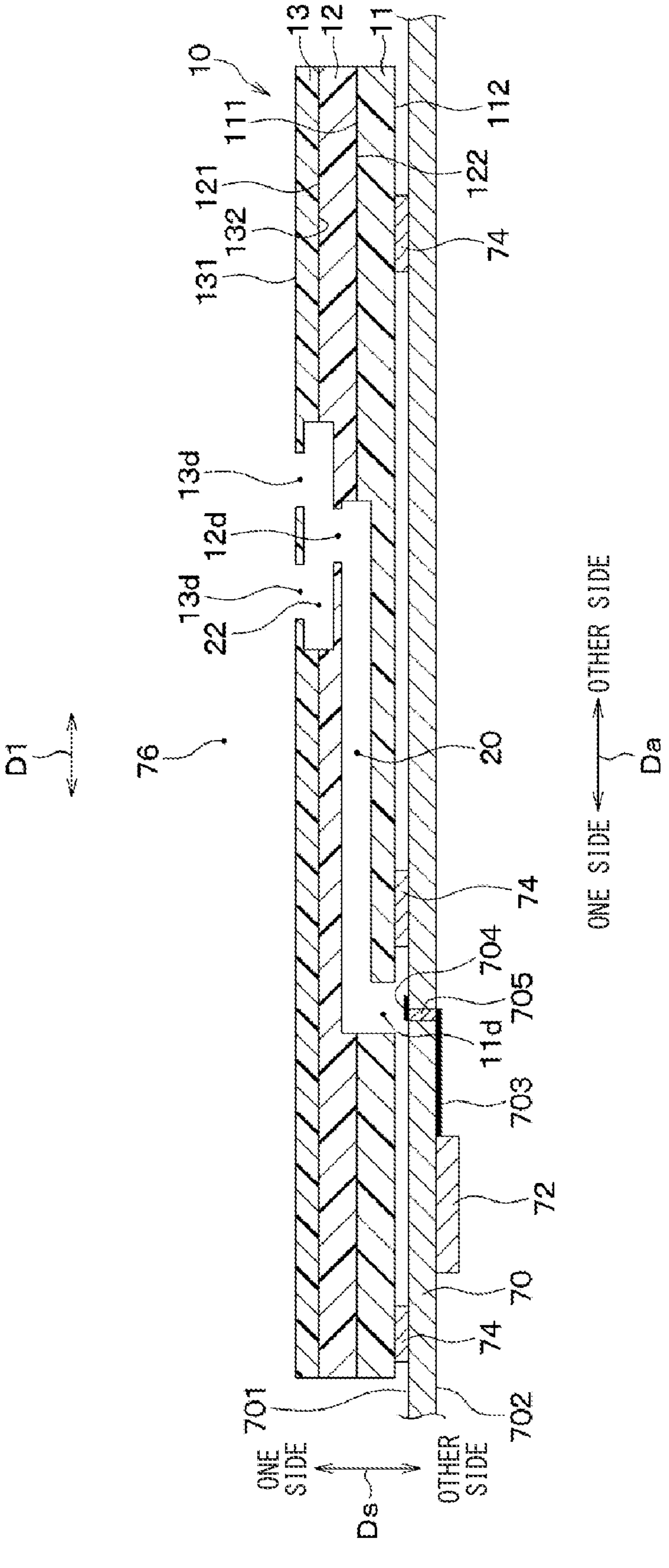
FIG. 8 is a cross-sectional view schematically showing a schematic configuration of an antenna device in a fourth embodiment, and is a view corresponding to FIG. 1.

As shown in FIG. 8, an MMIC 72 is soldered and mounted not on a one surface 701 of an electric board 70 but on an other surface 702 of the electric board 70. Therefore, a recess 113 (see FIG. 7) is not formed in a first stacked part 11.

Further, in the electric board 70, an input/output unit 704 is formed on the one surface 701 of the electric board 70 as in the third embodiment, but a connection wiring 703 is formed not on the one surface 701 but on the other surface 702.

The electric board 70 has a through hole 705 that penetrates the electric board 70 and electrically connects the connection wiring 703 and the input/output unit 704. The connection wiring 703 is connected to a terminal of the MMIC 72 by soldering, and a tip of the connection wiring 703 is connected to the input/output unit 704 via the through hole 705. Thereby, the input/output unit 704 is electrically connected to the MMIC 72 via the through hole 705 and the connection wiring 703.

Aside from the above-described aspects, the present embodiment is the same as the third embodiment. Further, in the present embodiment, the same effects as in the third embodiment are obtainable from the configuration common to the third embodiment described above.

Fifth Embodiment

The fifth embodiment is described next. In the present embodiment, different points from the fourth embodiment described above will be mainly explained.

Figure 9:
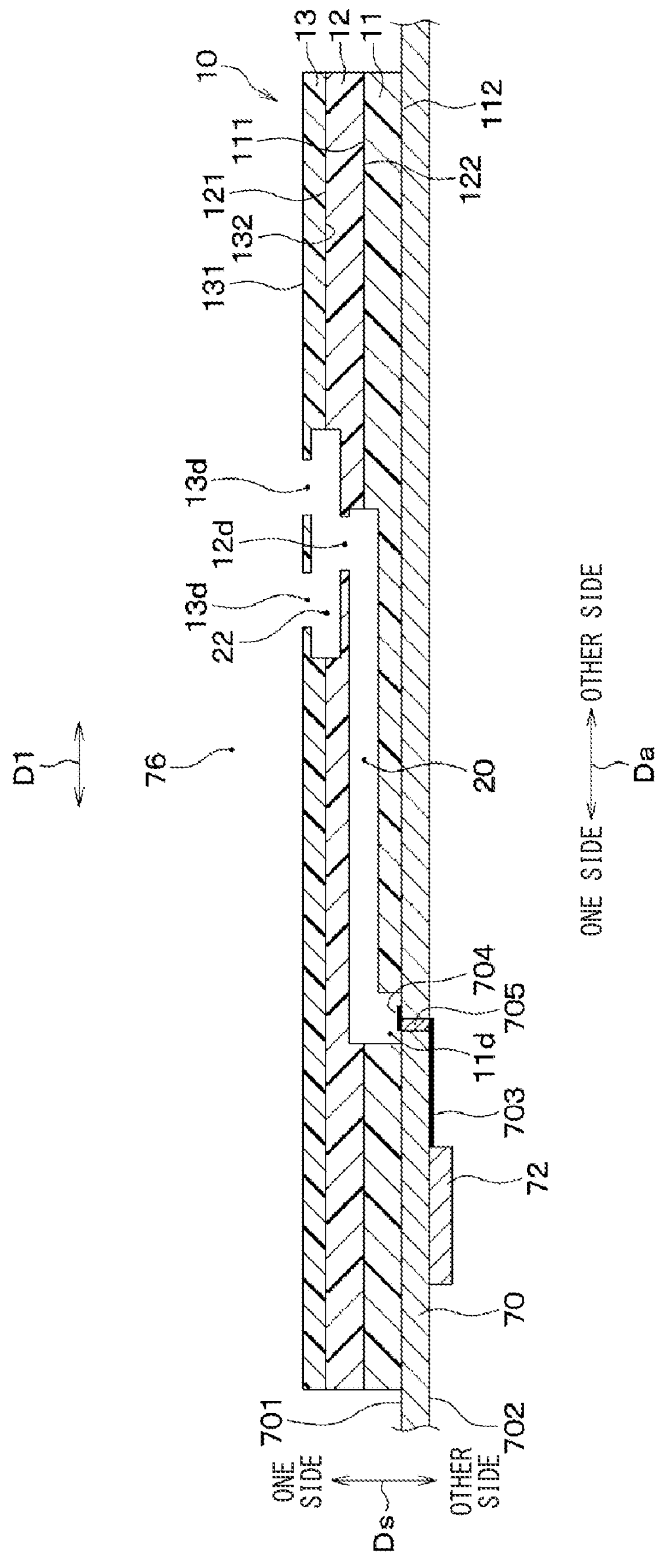
FIG. 9 is a cross-sectional view schematically showing a schematic configuration of an antenna device in a fifth embodiment, and is a view corresponding to FIG. 1.

As shown in FIG. 9, in the present embodiment, the spacer 74 (see FIG. 8) is not provided, and an antenna device 10 is arranged such that a first stacked part 11 is in contact with a one surface 701 of an electric board 70. Although the spacer 74 is not provided in the present embodiment, a first film 11*b* (see FIG. 2) of the first stacked part 11 is electrically connected to a ground pattern of the electric board 70, as in the fourth embodiment.

Aside from the above-described aspects, the present embodiment is the same as the fourth embodiment. Further, in the present embodiment, the same effects as the fourth embodiment described above are obtainable in the same manner as in the fourth embodiment.

Sixth Embodiment

The sixth embodiment is described next. The present embodiment is explained mainly with respect to points different from those of the first embodiment.

Figure 10:
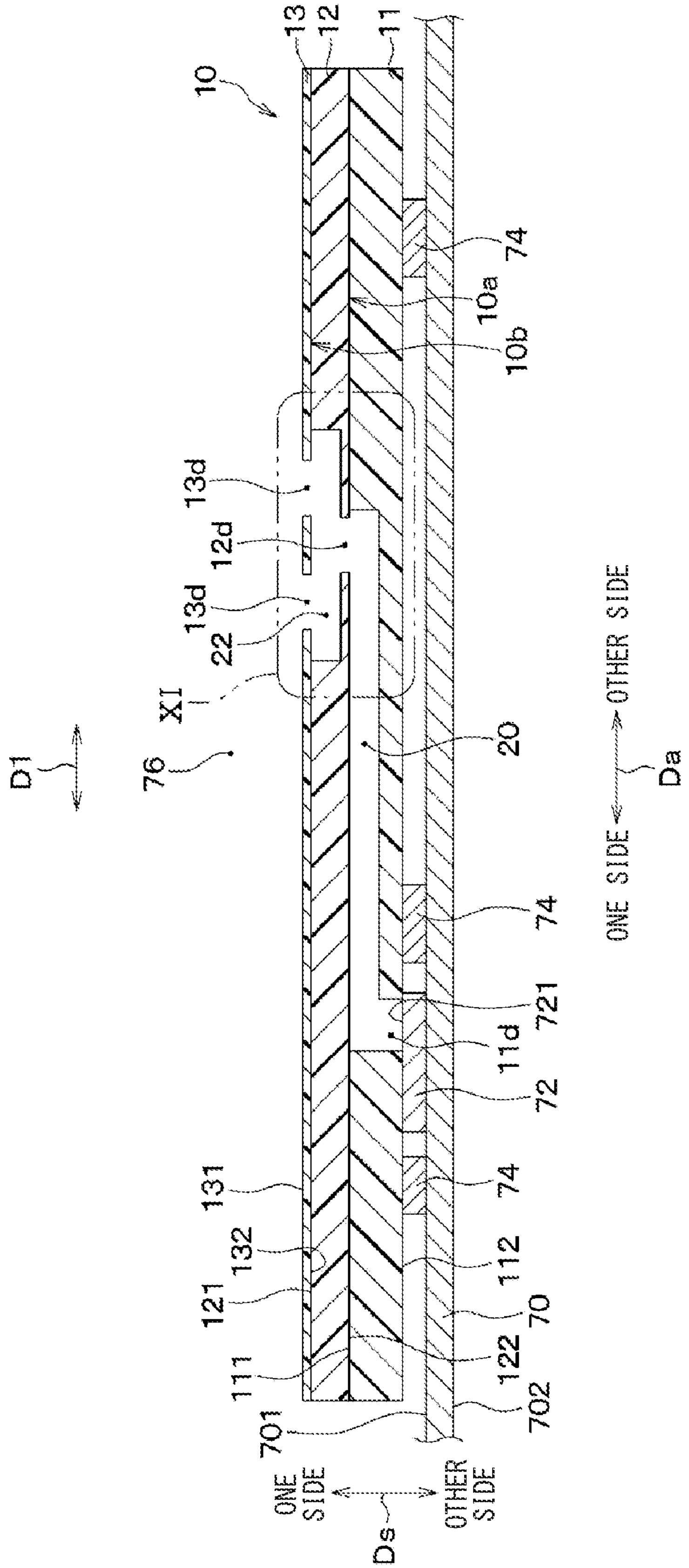
FIG. 10 is a cross-sectional view schematically showing a schematic configuration of an antenna device in a sixth embodiment, and is a view corresponding to FIG. 1.
Figure 11:
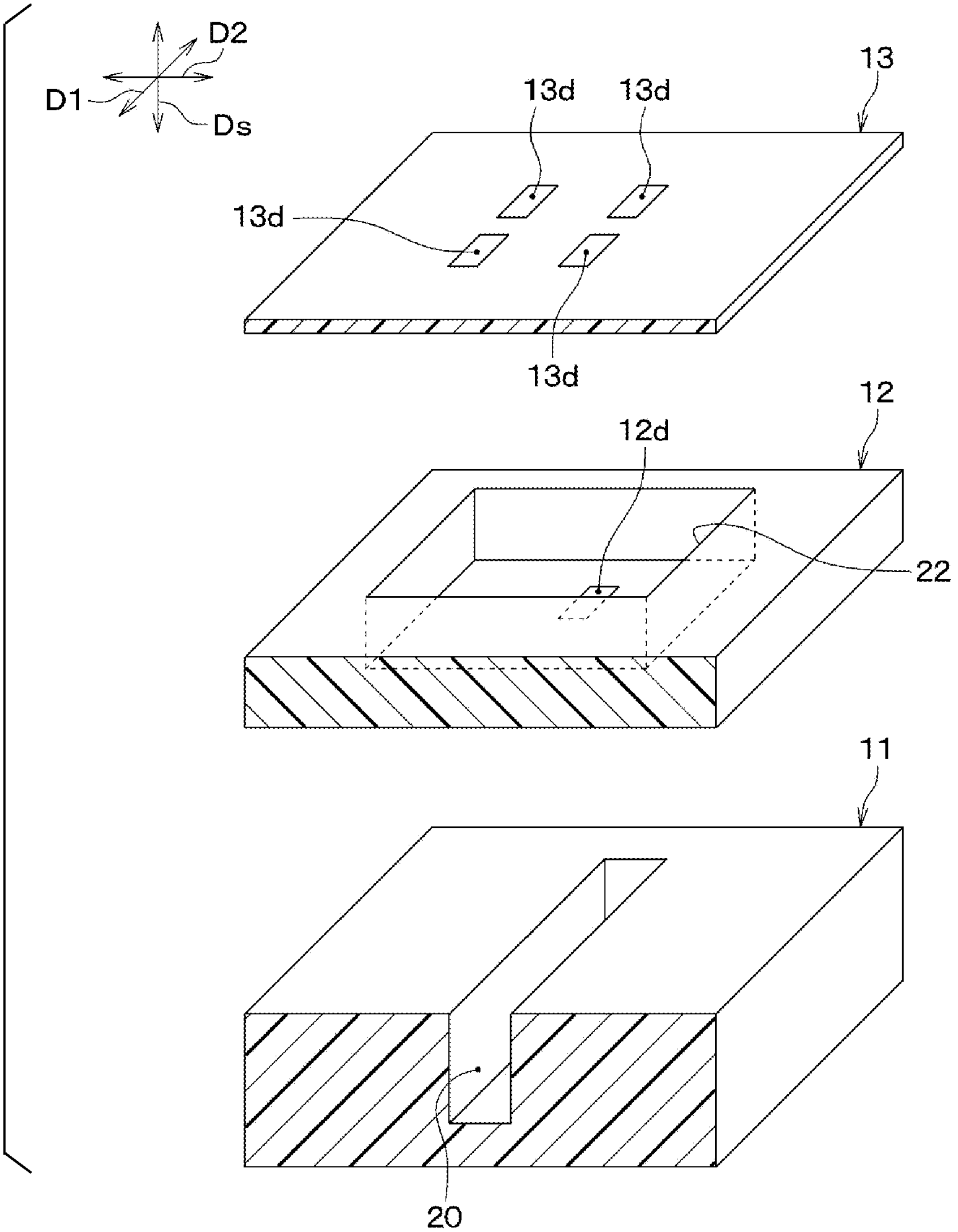
FIG. 11 is an exploded perspective view schematically showing a portion XI in FIG. 10 of the antenna device of the sixth embodiment, and is a view corresponding to FIG. 4.

As shown in FIGS. 10 and 11, a waveguide 20 of the present embodiment is formed at a position between a first stacked part 11 and a second stacked part 12, similarly to the first embodiment. However, unlike the first embodiment, the waveguide 20 in the present embodiment is formed to bite into the first stacked part 11 in the stack direction Ds, but is not formed to bite into the second stacked part 12 in the stack direction Ds.

That is, the waveguide 20 is formed as a combination of (a) a groove formed in the first stacked part 11 to be recessed from a first one surface 111 toward the other side in the stack direction Ds, and (b) a flat surface portion of a second other surface 122 facing the groove to serve as a lid part. Therefore, the waveguide 20 is not formed on the one side in the stack direction Ds of a seam 10*a* between the first stacked part 11 and the second stacked part 12, but extends from the seam 10*a* to the other side in the stack direction Ds.

A branch part 22 of the present embodiment is formed at a position between the second stacked part 12 and a third stacked part 13 similarly to the first embodiment. However, unlike the first embodiment, the branch part 22 is formed to bite into the second stacked part 12 in the stack direction Ds in the present embodiment, but it is not formed to bite into the third stacked part 13 in the stack direction Ds.

That is, the branch part 22 is formed as a combination of (a) a depression formed on the second stacked part 12 which is recessed from a second one surface 121 toward the other side in the stack direction Ds, and (b) a flat surface portion of a third other surface 132 facing the depression to serve as a lid part. Therefore, the branch part 22 is not formed on the one side in the stack direction Ds than the seam 10*b* between the second stacked part 12 and the third stacked part 13, but extends from the seam 10*b* to the other side in the stack direction Ds.

Aside from the above-described aspects, the present embodiment is the same as the first embodiment. Further, in the present embodiment, effects similar to those of the first embodiment described above are obtainable in the same manner as in the first embodiment.

Note that although the present embodiment is a modification based on the first embodiment, it is also possible to combine the present embodiment with any of the aforementioned second to fifth embodiments.

Seventh Embodiment

The seventh embodiment is described next. The present embodiment is explained mainly with respect to points different from those of the first embodiment.

Figure 12:
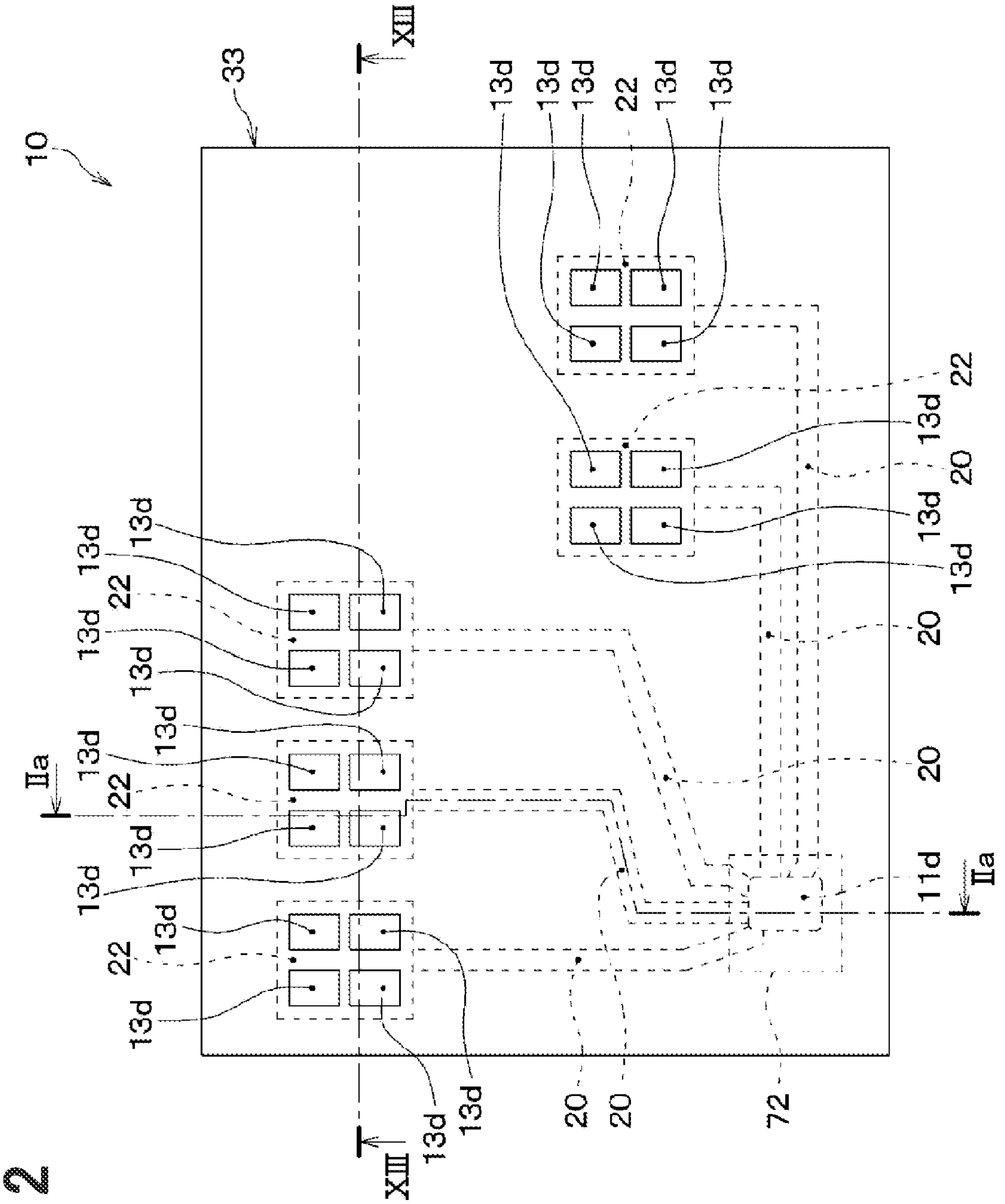
FIG. 12 is a plan view of the antenna device seen from one side in a stack direction in a seventh embodiment.
Figure 13:
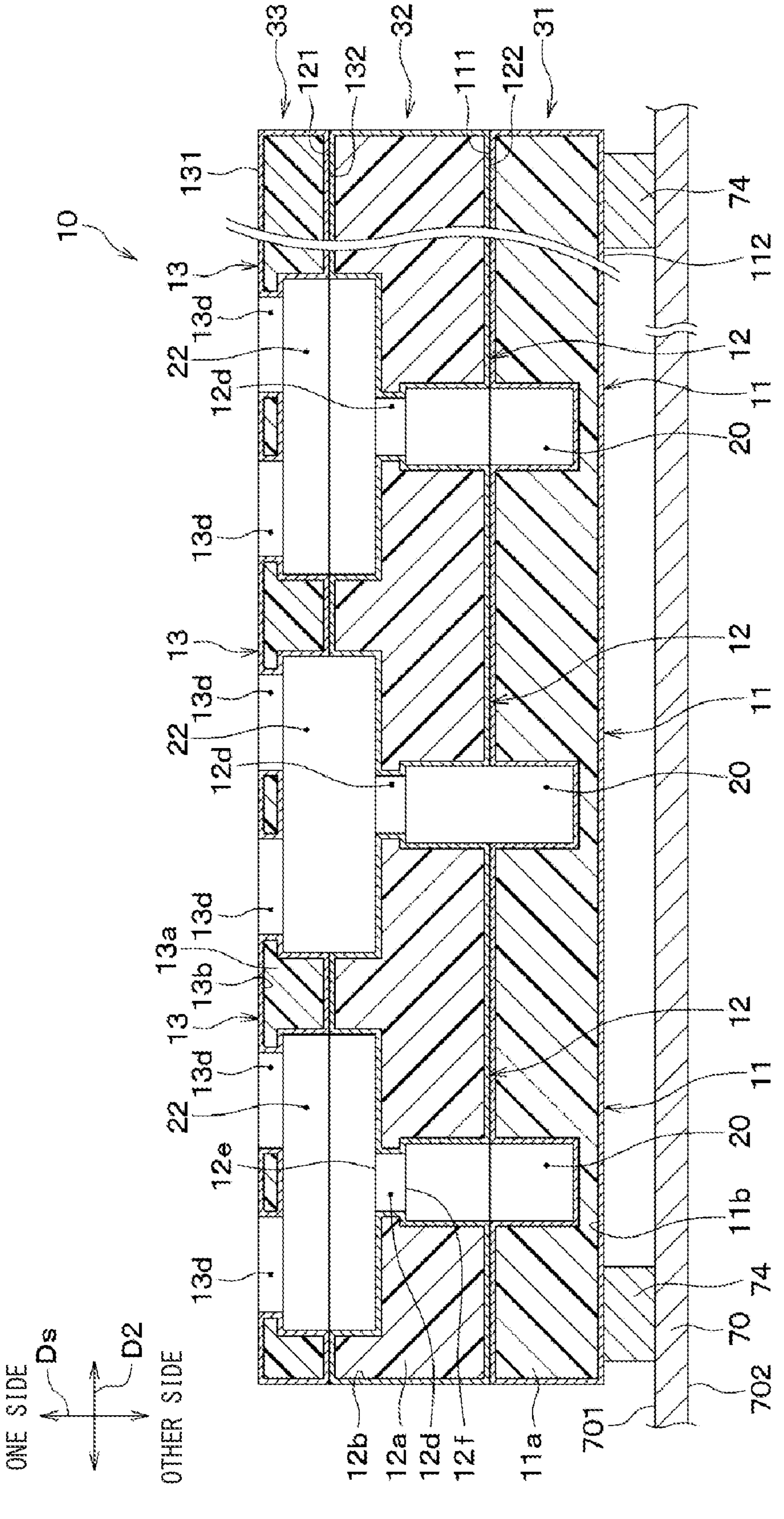
FIG. 13 is a cross-sectional view taken along a line XIII-XIII of FIG. 12 in the seventh embodiment, and is a view corresponding to FIG. 5.

As shown in FIGS. 12 and 13, an antenna device 10 of the present embodiment has a configuration in which the antenna devices 10 of the first embodiment are arranged in an array. Therefore, in the present embodiment, the antenna device 10 includes a plurality of first stacked parts 11, a plurality of second stacked parts 12, and a plurality of third stacked parts 13. The number of first stacked parts 11, the number of second stacked parts 12, and the number of third stacked parts 13 are the same, and in the present embodiment, they are all five. Note that the structure of the antenna device 10 in a IIa-IIa cross section of FIG. 12 is the same as the structure shown in FIG. 2. Further, a XIII-XIII cross-sectional line in FIG. 12, strictly speaking, does not pass through an intermediate passage 12*d*, but in FIG. 13, the intermediate passage 12*d* is deliberately shown in cross-section for the ease of understanding.

Specifically, the antenna device 10 of the present embodiment includes three plate-like bodies 31, 32, and 33 having a plate shape with the stack direction Ds as the normal direction. The three plate-like bodies 31, 32, and 33 are a first plate-like body 31, a second plate-like body 32, and a third plate-like body 33. It is configured that the first plate-like body 31 includes a plurality of first stacked parts 11, the second plate-like body 32 includes a plurality of second stacked parts 12, and the third plate-like body 33 includes a plurality of third stacked parts 13. Therefore, the second plate-like body 32 is stacked on one side of the first plate-like body 31 in the stack direction Ds, and the third plate-like body 33 is stacked on one side of the second plate-like body 32 in the stack direction Ds.

The plurality of first stacked parts 11 of the first plate-like body 31 and the plurality of second stacked parts 12 of the second plate-like body 32 form a plurality of waveguides 20 at positions between the first stacked part 11 and the second stacked part 12. Further, the plurality of second stacked parts 12 of the second plate-like body 32 and the plurality of third stacked parts 13 of the third plate-like body 33 form a plurality of branch parts 22 at positions between the second stacked part 12 and the third stacked part 13. For example, the number of waveguides 20 is the same as the number of first stacked parts 11, the number of second stacked parts 12, and the number of third stacked parts 13, and the number of branch parts 22 is also the same as the number of first stacked parts 11, the number of second stacked parts 12, and the number of third stacked parts 13.

However, in the present embodiment, the external ports 11*d* are consolidated, and, for example, the number of external ports 11*d* formed in the first plate-like body 31 is one. Therefore, the plurality of waveguides 20 are collectively connected to one external port 11*d* formed in the first plate-like body 31. In other words, the one external port 11*d* is connected to each of the one ends 20*a* (see FIG. 2) of the plurality of waveguides 20.

(1) As described above, according to the present embodiment, a plurality of first stacked parts 11, a plurality of second stacked parts 12, and a plurality of third stacked parts 13 are provided, and the plurality of waveguides 20 are collectively connected to one external port 11*d* formed in the plate-like body 31. Therefore, the input/output unit 721 of the MMIC 72 is connectable to a large number of antenna radiating elements 13*d*, compared to a case where there is one first stacked part 11, one second stacked part 12, and one third stacked part 13, thereby it is possible to increase the gain of the antenna device 10.

The present embodiment is similar to the first embodiment, except for the above-described aspects. Thus, the present embodiment can achieve the advantages obtained by the configuration common to the first embodiment described above in a similar manner as in the first embodiment.

The present embodiment is a modification based on the first embodiment and can also be combined with any of the second to the sixth embodiments described above.

OTHER EMBODIMENTS (1) In each of the above embodiments, as shown in FIG. 2, the first to third films 11*b*, 12*b*, and 13*b* are all metal films formed by plating, but such a configuration is just an example. For example, the first to third films 11*b*, 12*b*, and 13*b* may be implemented as conductive films formed by sputtering, application of conductive paint, or the like.

(2) In each of the above embodiments, as shown in FIGS. 2 and 5, the first film 11*b* covers the entire surface of the first resin member 11*a*, it may also be assumed that the first film 11*b* is not provided in a portion of the surface of the first resin member 11*a*. For example, the first film 11*b* may be not provided on (i.e., may be dispensable from) a portion of surface of the first resin member 11*a* which is not required for the antenna device 10 to function as an antenna. Such a configuration is also applicable to the second film 12*b* and the third film 13*b*.

(3) In each of the embodiments described above, the MMIC 72 shown in FIG. 1, for example, transmits and receives radio waves, but this is just an example. The MMIC 72 may only be one of a transmitter and a receiver of the radio waves and not both.

Figure 4:
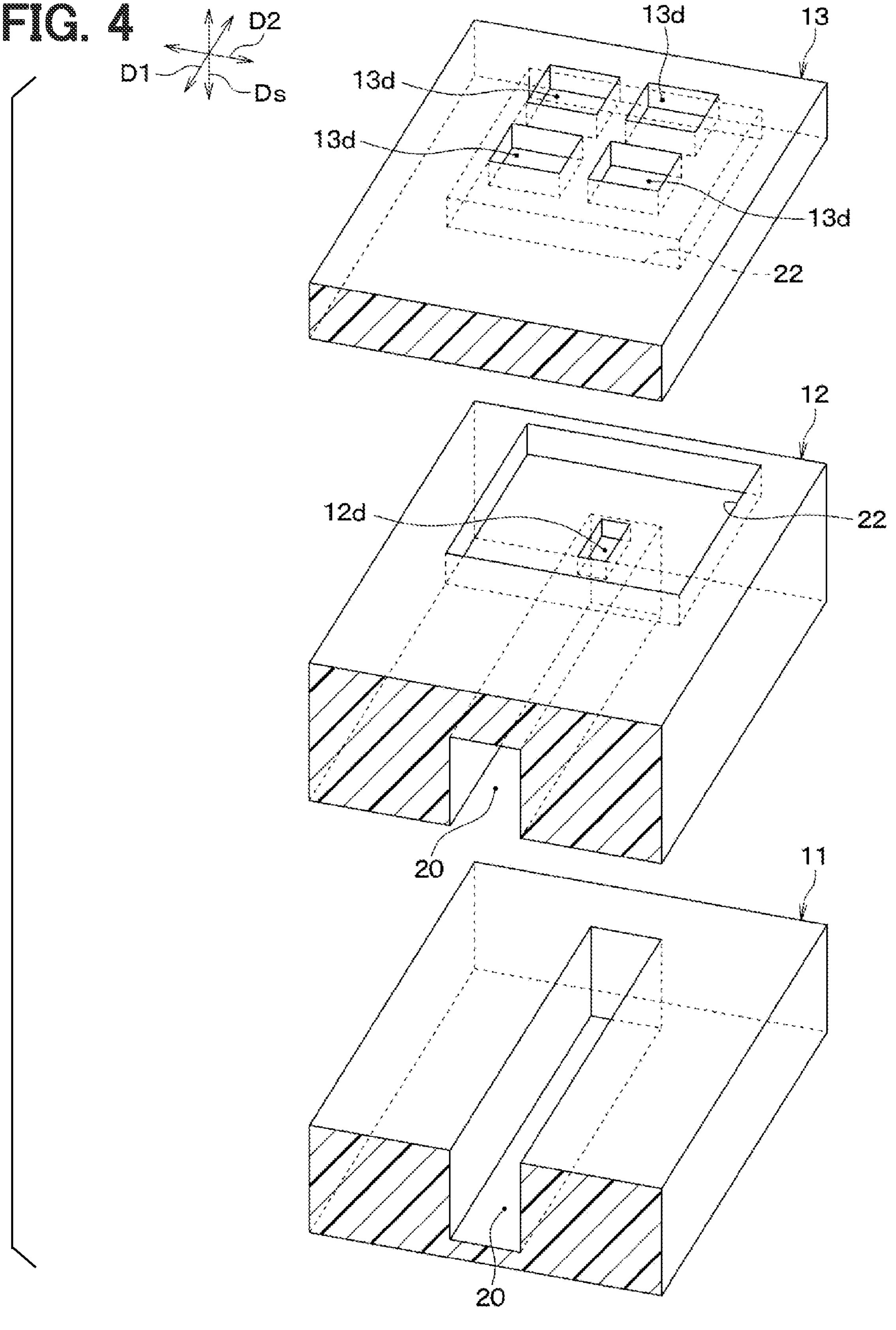
FIG. 4 is an exploded perspective view schematically showing a portion shown in FIG. 3 of the antenna device of the first embodiment.

(4) In each of the above-described embodiments, as shown in FIG. 4, each of the plurality of antenna radiating elements 13*d* has a rectangular cross-sectional shape when viewed along the stack direction Ds. However, the cross-sectional shape may also be a shape other than a rectangle, such as a circle.

Figure 3:
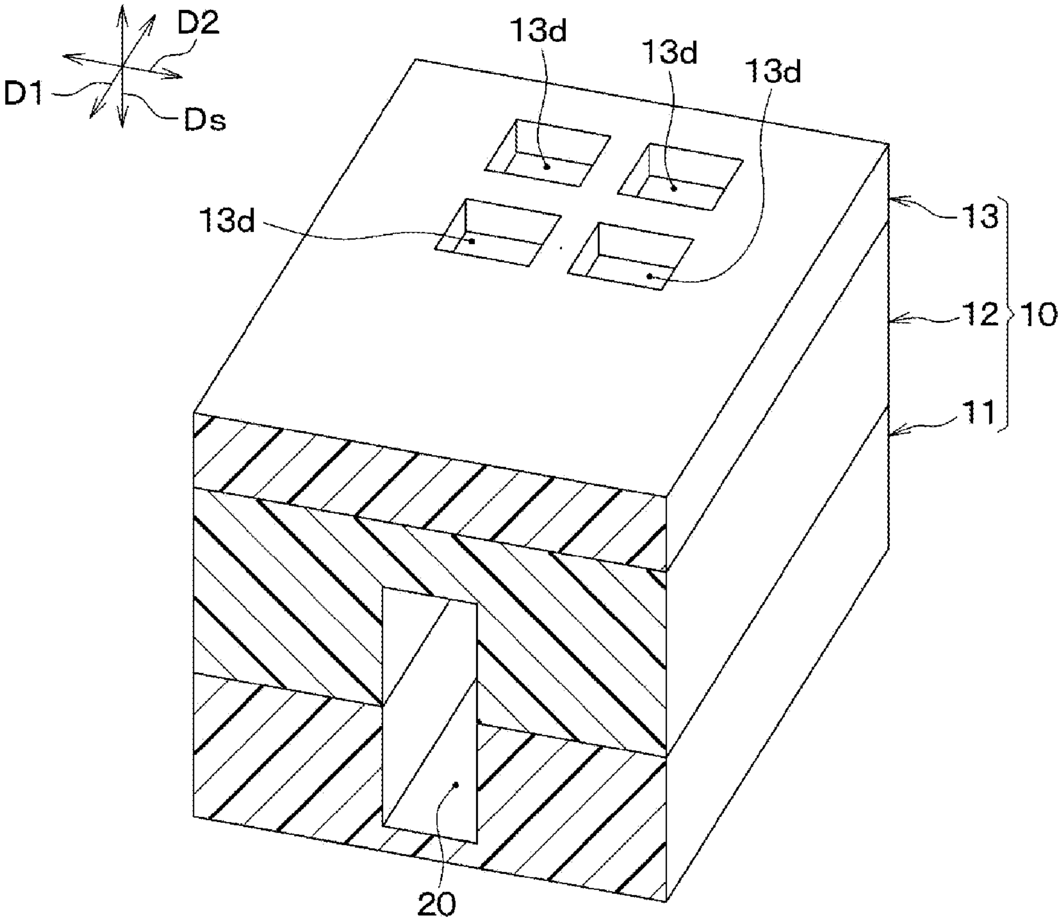
FIG. 3 is a perspective view schematically showing a portion III of FIG. 2 in the first embodiment.

(5) In each of the above-described embodiments, as shown in FIG. 3, for example, four antenna radiating elements 13*d* are provided in the third stacked part 13. However, the number of antenna radiating elements 13*d* may also be two, three or five or more.

(6) In each of the above embodiments, as shown in FIG. 4, the intermediate passage 12*d* has a rectangular cross-sectional shape when viewed along the stack direction Ds. However, the intermediate passage 12*d* may also have a circular cross-sectional shape, or the like, i.e., the shape may be other than rectangular.

(7) Further, although one intermediate passage 12*d* is provided for each waveguide 20, a plurality of intermediate passages 12*d* may be provided for each waveguide 20.

(8) In each of the above embodiments, as shown in FIG. 1, for example, the passage axial direction Da in which the waveguide 20 extends coincides with the first direction D1, but this is just an example. The passage axial direction Da may be somewhat inclined with respect to the first direction D1.

(9) In the above-described first embodiment, as shown in FIG. 1, the waveguide 20 extends, for example, along a straight line. However, the waveguide 20 may extend in a curved manner. In such case, the passage axial direction Da is a tangential direction of a center axis of the waveguide 20.

(9) The present disclosure is not limited to the embodiments described above, and various modifications may be made. Each of the above embodiments, which are relevant to each other, is combinable to the other one unless such combination is clearly impossible.

Further, individual elements or features of a particular embodiment are not necessarily essential unless it is specifically stated that the elements or the features are essential in the foregoing description, or unless the elements or the features are obviously essential in principle. Further, in each of the above embodiments, in case where the number of the constituent element(s), the value, the amount, the range, and the like is specified, the present disclosure is not necessarily limited to the number of the constituent element(s), the value, the amount, and the like specified in the embodiment unless the number of the constituent element(s), the value, the amount, and the like is indicated as indispensable or is obviously indispensable in view of the principle of the present disclosure. Further, in each of the embodiments described above, when referring to the material, shape, positional relationship, and the like of the components and the like, except in case (a) where the components are explicitly specified, and (b) where the components are fundamentally limited to a specific material, shape, positional relationship, and the like, the components are not limited to the material, shape, positional relationship, and the like.

What is claimed is:

1. An antenna device configured to cause radio waves to propagate therethrough, the antenna device comprising:

a first stacked part including a first resin member made of resin and a first film conductive and covering a surface of the first resin member, the first stacked part having an external port to cause radio waves to propagate to an external device that is configured to perform at least one of transmission or reception of the radio waves;

a second stacked part stacked on one side of the first stacked part in a stack direction, the second stacked part having a second resin member made of resin and a second film electrically connected to the first film and covering a surface of the second resin member, the second stacked part having an intermediate passage to cause the radio waves to propagate therethrough; and a third stacked part stacked on one side of the second stacked part in the stack direction and facing an external space on one side in the stack direction, the third stacked part having a third resin member made of resin and a third film electrically connected to the second film and covering the surface of the third resin member, the third stacked part having a plurality of antenna radiating elements connected to the external space to cause the radio waves to propagate to the external space, wherein the intermediate passage has one end on one side in the stack direction and an other end on an other side opposite to the one side in the stack direction, the first stacked part and the second stacked part are stacked to face each other to form a waveguide that extends in a passage axis direction that intersects the stack direction, the waveguide is connected to the external port and to the other end of the intermediate passage to cause the radio waves to propagate between the external port and the intermediate passage, each of the antenna radiating elements is coupled to the one end of the intermediate passage, the second stacked part and the third stacked part are stacked on one another to form a branch part via which the second stacked part and the third stacked part face each other, the branch part is at a position between the antenna radiating elements and the intermediate passage and is connected to each of the antenna radiating elements and the intermediate passage to cause the radio waves to propagate between each of the antenna radiating elements and the intermediate passage, the branch part is larger than the waveguide in a width direction that is perpendicular to the stack direction and the passage axis direction, and the antenna radiating elements are arranged side by side in the width direction.

2. The antenna device according to claim 1, wherein the branch part is formed to bite into the second stacked part in the stack direction and not to bite into the third stacked part in the stack direction.

3. The antenna device according to claim 1, wherein the branch part is formed to bite into each of the second stacked part and the third stacked part in the stack direction.

4. The antenna device according to claim 1, wherein the waveguide is formed to bite into the first stacked part in the stack direction and not to bite into the second stacked part in the stack direction.

5. The antenna device according to claim 1, wherein the first stacked part includes a plurality of the first stacked parts, the second stacked part includes a plurality of the second stacked parts, the third stacked part includes a plurality of the third stacked parts, the first stacked parts constitute a plate-like body having a plate shape with the stack direction as a normal direction, the first stacked parts and the second stacked parts form a plurality of waveguides, and the waveguides are collectively connected to the external port that is a singular port and formed in the plate-like body.

6. The antenna device according to claim 2, wherein the waveguide is formed to bite into the first stacked part in the stack direction and not to bite into the second stacked part in the stack direction.

* * * * *